Jan. 3, 1928.
R. W. DE MONTE
1,655,048
ELECTRICAL COIL SYSTEM
Filed March 2, 1927
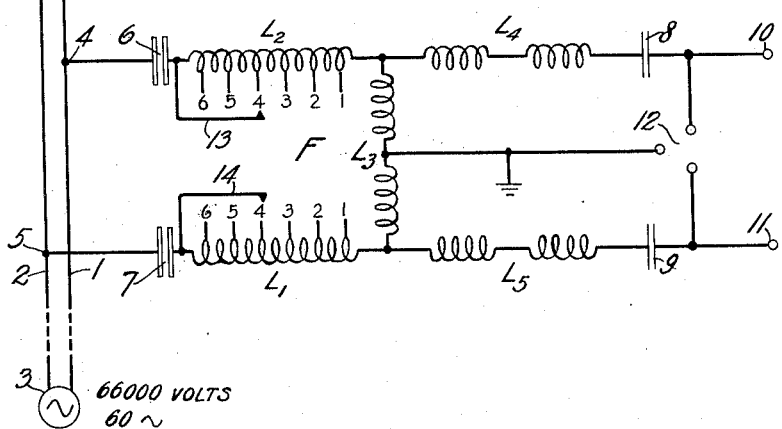
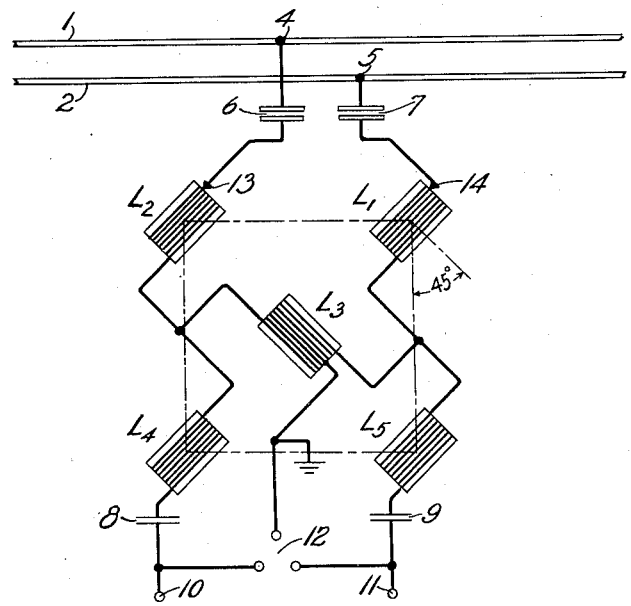
INVENTOR
ROBERT W. DEMONTE
BY
ATTORNEY Patented Jan. 3, 1928.

1,655,048

UNITED STATES PATENT OFFICE.

ROBERT W. DE MONTE, OF JERSEY CITY, NEW JERSEY, ASSIGNOR TO BELL TELEPHONE LABORATORIES, INCORPORATED, OF NEW YORK, N. Y., A CORPORATION OF NEW YORK.

ELECTRICAL COIL SYSTEM.

Application filed March 2, 1927. Serial No. 172,142.

This invention relates to electrical coil systems and more particularly to the coil systems of broad band wave filters or other wave transmission networks.

When two or more coils of the straight, or open, core type are arranged in proximity to each other in the same or different circuits and an alternating or a pulsating direct current is passed through each, a magnetic flux is built up and extends a distance in all directions from each coil so that the flux of one links with the flux of another, thereby giving rise to a magnetic coupling between coils. This magnetic coupling is generally known as mutual inductance and may be objectionable, particularly in communicating systems. While mutual inductance may be practically eliminated by the use of toroidal coils or coils having closed cores, it is often advantageous to employ coils having open magnetic circuits with or without cores of magnetic material.

According to the present invention, specifically stated, magnetic coupling between the coils of an electrical coil system, such as may be used in an electrical wave filter, is substantially reduced by disposing the coils at the four corners and the center of a square respectively, the corner coils being aligned with their axes approximately parallel to one diagonal of the square and the center coil having its axis perpendicular thereto. In this arrangement, the axes of adjacent corner coils form an angle of approximately 45° with the side of the square or with lines connecting their centers. The mutual inductance between the center coil and each of the corner coils is eliminated by placing the coils in mutually perpendicular planes intersecting at the center of one coil. The mutual inductance between the adjacent corner coils, although not eliminated, is greatly reduced by virtue of the inclination of their axes to the lines joining their centers. In this manner, eight out of a possible ten mutual inductances are almost completely eliminated and the two remaining mutual inductances which exist between coils diametrically opposite to each other are negligibly small because of the distance between these coils.

A more complete understanding of this invention may be had from a consideration of the following description of a preferred embodiment together with the accompanying drawing, in which:

Fig. 1 shows a schematic circuit diagram of the coil system of this invention used as a filter in a power line carrier current telephone system; and, Fig. 2 represents the layout of the coils with respect to the system shown in Fig. 1, and the physical arrangement of the coils with respect to each other.

Like characters refer to like parts throughout the three figures.

Referring to Fig. 1, conductors 1 and 2 of a high tension power line are connected to a source 3 of alternating current having, for example, a voltage of 66,000 volts and a frequency of 60 cycles. In addition to furnishing power for various purposes this line is also employed for the transmission of carrier currents of widely varied frequencies, such as those used in transmitting telephone, telegraph and signaling messages.

Assuming then that the line has superimposed thereon carrier currents modulated in accordance with the variations in currents representing telephone and telegraph messages, and that it is desired to receive these messages at a designated point on the line, such as 4—5, it will be necessary to employ means to prevent the high voltage current from entering the receiving apparatus and to select from the various currents on the line the particular band of frequencies serving as the carrier of the telephone current. This is best accomplished by connecting at points 4 and 5 a receiving circuit comprising two high voltage condensers 6 and 7 and a filter F. The high voltage condensers are of low capacity and high impedance to currents having a frequency of 60 cycles and are connected directly to the power line. The condensers serve to prevent practically all of the 60 cycle current from entering the receiving circuit and causing damage to the receiving apparatus and possible injury to the user. However, the low voltage currents of higher frequencies are permitted to pass through the condensers and are received in the filter.

The filter which comprises in addition to the two high voltage condensers a series of inductance elements $L_1$ to $L_5$ inclusive and two low voltage condensers 8 and 9, is connected at its output terminals 10 and 11 to the telephone receiving apparatus (not shown). The filter is designed to receive the comparatively low voltage carrier current frequencies with their associated side bands, as well as any other low voltage currents which may be induced in the line, and to transmit the particular band of frequencies employed for the telephone message, to the receiving apparatus, the frequencies outside the selected range being suppressed. The receiving apparatus may comprise any form of modulating device for suppressing the telephone carrier current thereby permitting the impulses of the voice current to pass on to the receiver in the condition in which they were originally transmitted. The receiving apparatus is further protected from high voltages by connecting across the output terminals of the filter a spark gap 12 having one electrode grounded. This spark gap is provided primarily for the purpose of draining off surges of high voltage such as may be produced by lightning or induced from nearby power lines. Inductance elements $L_2$ and $L_4$ are connected in series between condensers 6 and 8, and inductance elements $L_1$ and $L_5$ are similarly connected between condensers 7 and 9. Inductance element $L_3$, having a mid-tap to ground, interconnects the opposite sides of the filter. In order that the filter may be employed at any point along the line 1—2, the inductance elements $L_2$ and $L_1$ are made adjustable so that the inductance in each of these elements may be adjusted by moving taps 13 and 14 to adapt the filter to the impedance of the power line.

Inasmuch as each section of the filter comprises an inductance element, there is an opportunity for injurious reaction between sections through the external electromagnetic fields of these inductance elements. This reaction, or mutual inductance may be almost entirely suppressed by the use of closed core coils such as the toroidal type in which the external magnetic field is practically eliminated, but coils of this type are expensive to wind and have a high effective resistance in relation to their inductance as compared with straight core coils of proper design. It is therefore often desirable to use straight core inductances which can be cheaply constructed and which result in a small amount of power dissipation. Such inductances, however, have an inherently large stray magnetic field. In order to reduce the effect of this stray magnetic field, the inductance coils $L_1$ to $L_5$ have been arranged to form a square, as shown in Fig. 2, coils $L_1$, $L_2$, $L_4$ and $L_5$ being respectively disposed at the four corners with their axes aligned parallel to one diagonal of the square, and coil $L_3$ being disposed at the center with its axis perpendicular to the diagonal with which the other coils are parallelly arranged.

Inasmuch as this invention is concerned solely with the physical arrangement of the coils, Fig. 2 is an effective embodiment of the present invention applied to the filter shown in Fig. 1. Practical consideration of economy of space and of the reduction of the mutual inductances between coils arranged in propinquity have necessitated the use of such an arrangement. The layout illustrated in Fig. 2 meets these requirements inasmuch as it presents a compact assembly and an arrangement in which the mutual inductance between coils is eliminated or reduced to a negligible value. The mutual inductance between coil $L_3$ and each of coils $L_1$, $L_2$, $L_4$ and $L_5$ is eliminated because the axis of coil $L_3$ is disposed in a plane perpendicular to the planes in which the axes of the other coils are disposed, and mutual inductance between adjacent corner coils is substantially reduced because of the 45° angle between their respective axes and the line joining their centers. Also, the mutual inductance between the coils which are disposed diametrically opposite to each other may be regarded as of minor importance because of the comparative distance between them, such as will be noted in the location of coils $L_1$ and $L_4$, and $L_2$ and $L_5$.

What is claimed is:

1. An electrical coil system comprising coils arranged in the corners of a square, said coils being disposed with their magnetic axes approximately parallel to one diagonal of the square to thereby reduce the mutual inductance between said coils.

2. An electrical coil system comprising straight core coils arranged in the corners of a square, said coils being disposed with their magnetic axes approximately parallel to one diagonal of the square to thereby reduce the mutual inductance between said coils.

3. An electrical coil system comprising four coils arranged in the corners of a square, said coils being disposed with their magnetic axes in the same plane and extending approximately parallel to one diagonal of the square to thereby reduce the mutual inductance between said coils.

4. An electrical coil system comprising four coils arranged in the four corners of a square, said coils being disposed with their magnetic axes in the same plane and at 45° angles with the lines joining the centers of the adjacent coils.

5. An electrical coil system comprising five coils disposed at the four corners and the center of a square respectively, the corner coils being aligned with their axes parallel to one diagonal of the square and the center coil having its axis perpendicular to the diagonal.

6. An electrical coil system comprising five coils disposed at the four corners and the center of a square, the corner coils being aligned with their axes parallel to one diagonal of the square, the center coil having its axis perpendicular to said diagonal and all coils having their axes in a common plane whereby the mutual inductance in the system is reduced to a negligible value.

7. An electrical coil system comprising five coils disposed at the four corners and the center of a square, each corner coil being aligned to form a 45° angle between its magnetic axis and a straight line joining its center with that of the coil in an adjacent corner, and the center coil being aligned to form a 90° angle between its magnetic axis and the axes of the corner coils.

In witness whereof, I hereunto subscribe my name this 26th day of February, A. D. 1927.

ROBERT W. DE MONTE.